United States Patent
Albero et al.

(10) Patent No.: US 12,177,214 B2
(45) Date of Patent: Dec. 24, 2024

(54) DATA OBFUSCATION AUTHENTICATION SECURITY DISPLAY SESSION SYSTEM

(71) Applicant: BANK OF AMERICA CORPORATION, Charlotte, NC (US)

(72) Inventors: George Anthony Albero, Charlotte, NC (US); Edward Lee Traywick, Bellbrook, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 296 days.

(21) Appl. No.: 17/736,745

(22) Filed: May 4, 2022

(65) Prior Publication Data

US 2023/0362159 A1     Nov. 9, 2023

(51) Int. Cl.
*H04L 9/40* (2022.01)
*G06F 21/62* (2013.01)

(52) U.S. Cl.
CPC ...... *H04L 63/0876* (2013.01); *G06F 21/6263* (2013.01); *H04L 63/16* (2013.01)

(58) Field of Classification Search
CPC . H04L 63/0876; H04L 63/16; G06F 21/6263; G06F 2221/211
See application file for complete search history.

(56) References Cited

U.S. PATENT DOCUMENTS

| | | | |
|---|---|---|---|
| 5,031,228 A | 7/1991 | Lu | |
| 5,699,449 A | 12/1997 | Javidi | |
| 5,781,650 A | 7/1998 | Lobo et al. | |
| 5,784,056 A | 7/1998 | Nielsen | |
| 5,835,616 A | 11/1998 | Lobo et al. | |
| 5,842,194 A | 11/1998 | Arbuckle | |
| 5,850,470 A | 12/1998 | Kung et al. | |
| 5,956,122 A | 9/1999 | Doster | |
| 5,982,912 A | 11/1999 | Fukui et al. | |
| 6,134,339 A | 10/2000 | Luo | |
| 6,173,068 B1 | 1/2001 | Prokoski | |
| 6,212,030 B1 | 4/2001 | Koriyama et al. | |
| 6,246,779 B1 | 6/2001 | Fukui et al. | |
| 6,301,370 B1 | 10/2001 | Steffens et al. | |
| 6,310,601 B1 | 10/2001 | Moore et al. | |
| 6,389,176 B1 | 5/2002 | Hsu et al. | |
| 6,461,807 B1 | 10/2002 | Friend et al. | |
| 10,217,103 B2 * | 2/2019 | Soundararajan | ............................ G06Q 20/40145 |
| 11,757,914 B1 * | 9/2023 | Jakobsson | ............... H04L 51/42 726/25 |
| 2002/0054059 A1 | 5/2002 | Schneiderman | |

(Continued)

*Primary Examiner* — Mohammad A Siddiqi
(74) *Attorney, Agent, or Firm* — Moore & Van Allen PLLC; Nicholas C. Russell

(57) ABSTRACT

Systems, computer program products, and methods are described herein for a data obfuscation authentication security display session. The invention provides a secondary authentication by recognizing the initial access to a display screen and overlaying and presenting false information on the screen. The false screen may mimic that of a real account screen, but the personal information about the user is false. The invention then requires the user to perform a secondary authentication to gain access information on the display session that is not false. The invention may allow for a duress code implementation in place of the secondary authentication, which initiates security protocols, include a continuum based protocol arrangement of security protocols.

17 Claims, 6 Drawing Sheets

(56) References Cited

U.S. PATENT DOCUMENTS

| | | | |
|---|---|---|---|
| 2002/0055955 A1 | 5/2002 | Lloyd-Jones et al. | |
| 2002/0087622 A1 | 7/2002 | Anderson | |
| 2002/0103813 A1 | 8/2002 | Frigon | |
| 2006/0212182 A1* | 9/2006 | Shaw | G01C 23/00 701/3 |
| 2010/0235918 A1* | 9/2010 | Mizrahi | H04L 63/168 726/25 |
| 2013/0091561 A1* | 4/2013 | Bruso | G06F 21/31 726/16 |
| 2014/0162598 A1* | 6/2014 | Villa-Real | G07F 7/0886 455/411 |
| 2015/0207887 A1* | 7/2015 | Feinleib | H04L 67/06 709/219 |
| 2016/0241695 A1* | 8/2016 | Elliott | H04M 1/6091 |
| 2019/0028270 A1* | 1/2019 | Foisy | H04L 67/12 |
| 2020/0238952 A1* | 7/2020 | Lindsay | G06V 30/194 |
| 2023/0254153 A1* | 8/2023 | Joshi | H04L 9/3242 713/155 |

* cited by examiner

DATA OBFUSCATION AUTHENTICATION SECURITY DISPLAY SESSION SYSTEM

BACKGROUND

With advancements in display technology, mobile or public location displays are becoming increasingly sharp. As such sensitive data accessed on the display sessions may be viewed by unintentional parties. As such, a need exists for data obfuscation authentication security display session triggering and deployment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In some embodiments, the invention provides for data obfuscation authentication security for a display session. In this way, when a user logs into an account, such as a sensitive account regarding resources or personal matters, once logged in the screen automatically displays the user information even if the user is in a public place where others may be able to see the screen. For example, once the user gains access to financial account information, whether at an automated teller machine (ATM), mobile application access, computer access, or the like, the financial information of the user is on display for anyone near the screen to see. This is the same for not just financial account information but for other personal information that may be presented on a display. Onlookers or other individuals may be able to visualize exact amounts that the user has in one or more financial accounts or other personal information of the user by being able to overlook and see the authenticated screen.

This system provides a secondary authentication by recognizing the initial access to an account by a user, but instead of presenting account or sensitive information, the system overlays and presents the user with a false account screen. The false account screen may mimic that of a real account screen, but the personal information about the user, such as their name, address, resource amounts, telephone numbers, and the like are not correct. The user may then perform a secondary authentication to gain access to the real account screen or select a duress code at the false account screen. Using the duress code, the system initiates security protocols. These security protocols include a complete shutdown of the user's phone, ATM, or computer, turning off all applications, requiring all applications to be password protected (voice or additional written password), sending alerts to authorities, sending alerts to financial institutions for misappropriation protection, locking the device, setting off alarm, or the like. The system may also identify the duress code and manipulate the camera of the phone, ATM, or computer to continually stay on and record.

In some embodiments, the invention comprises systems, methods, and computer program products for data obfuscation authentication security display session deployment, the invention comprising: identifying an initial successful authentication request to access a display session by a user from a device; accessing the device associated with the request to access the display session and determine a location of the device; triggering data obfuscation authentication security display whereby presenting a mimic display session as an initial display page to the user upon the successful authentication request to access the display session; receiving one of a continuum of duress codes from the device associated with the user via the mimic display session; and performing a security protocol task based on the duress code received, wherein the security protocol task includes an escalation continuum of protocol tasks.

In some embodiments, receiving one of the continuum of duress codes further triggers an override response of the device associated with the duress code and activates a camera on the device, wherein a stream from the camera is transmitted external to the device.

In some embodiments, the mimic display session displays a display session with user information changed, wherein the user information changed include user sensitive numbers including account numbers and amount numbers.

In some embodiments, the invention further comprises receiving a secondary authentication from the device associated with the user via the mimic display session and granting access to the display session with sensitive data.

In some embodiments, determining the location of the device further comprises determining the device is in a public location based on geolocation of the device.

In some embodiments, the display session further comprises a session that displays user sensitive data, wherein user sensitive data is financial account data.

In some embodiments, the escalation continuum of protocol tasks includes a security protocol task level of full, moderate, or minimal security depending on the one of the continuum of duress codes received.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
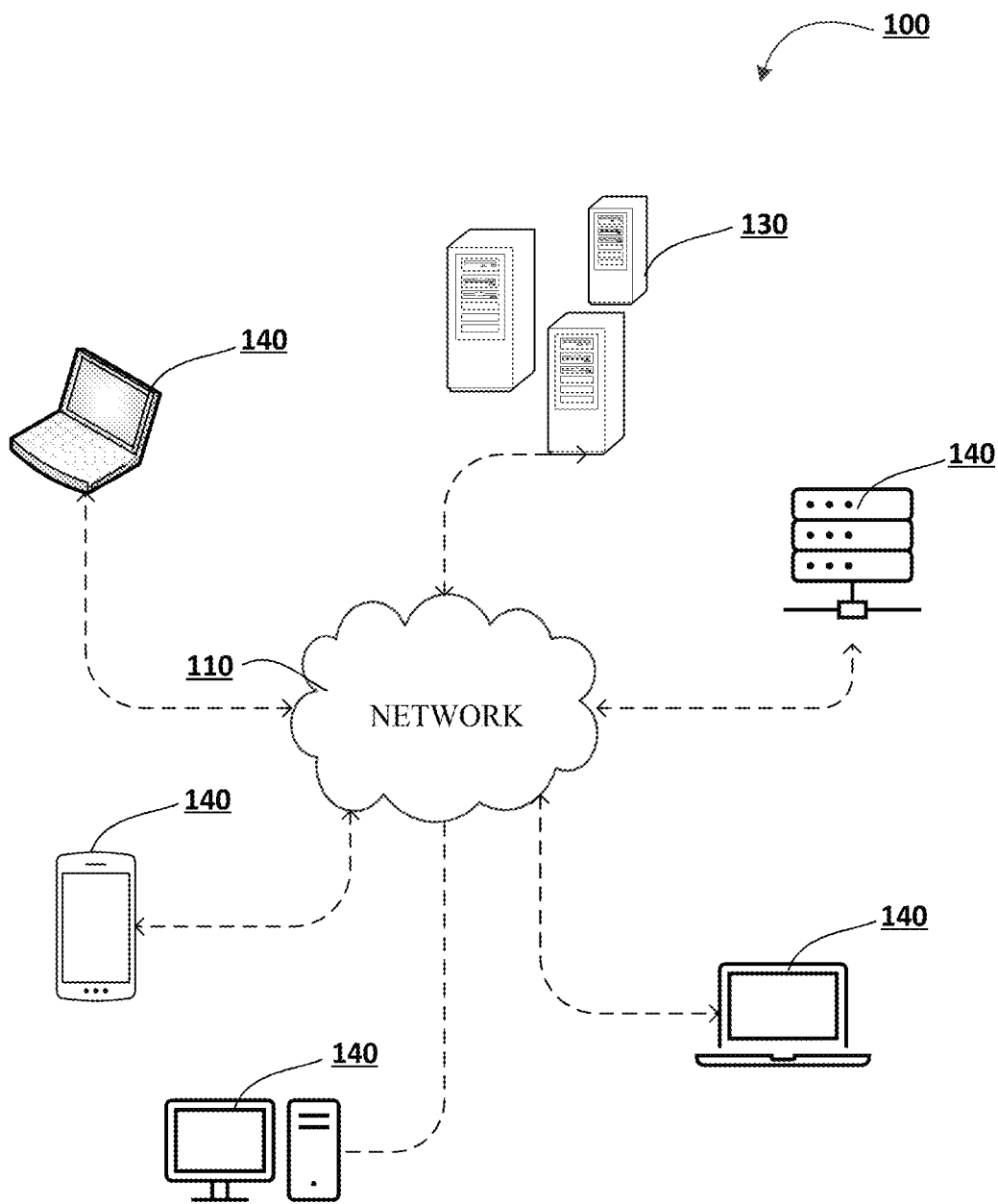
Figure 1B:
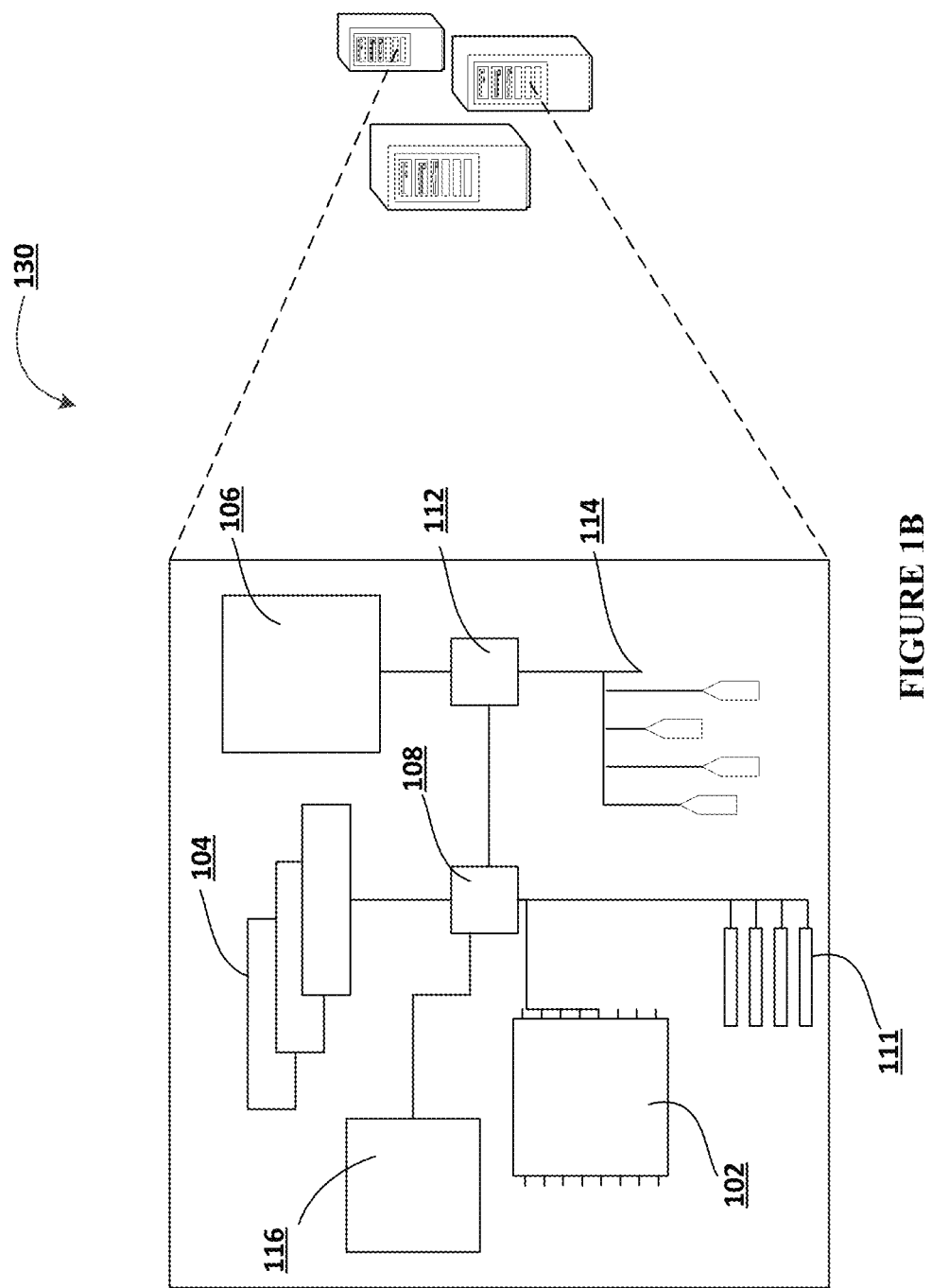
Figure 1C:
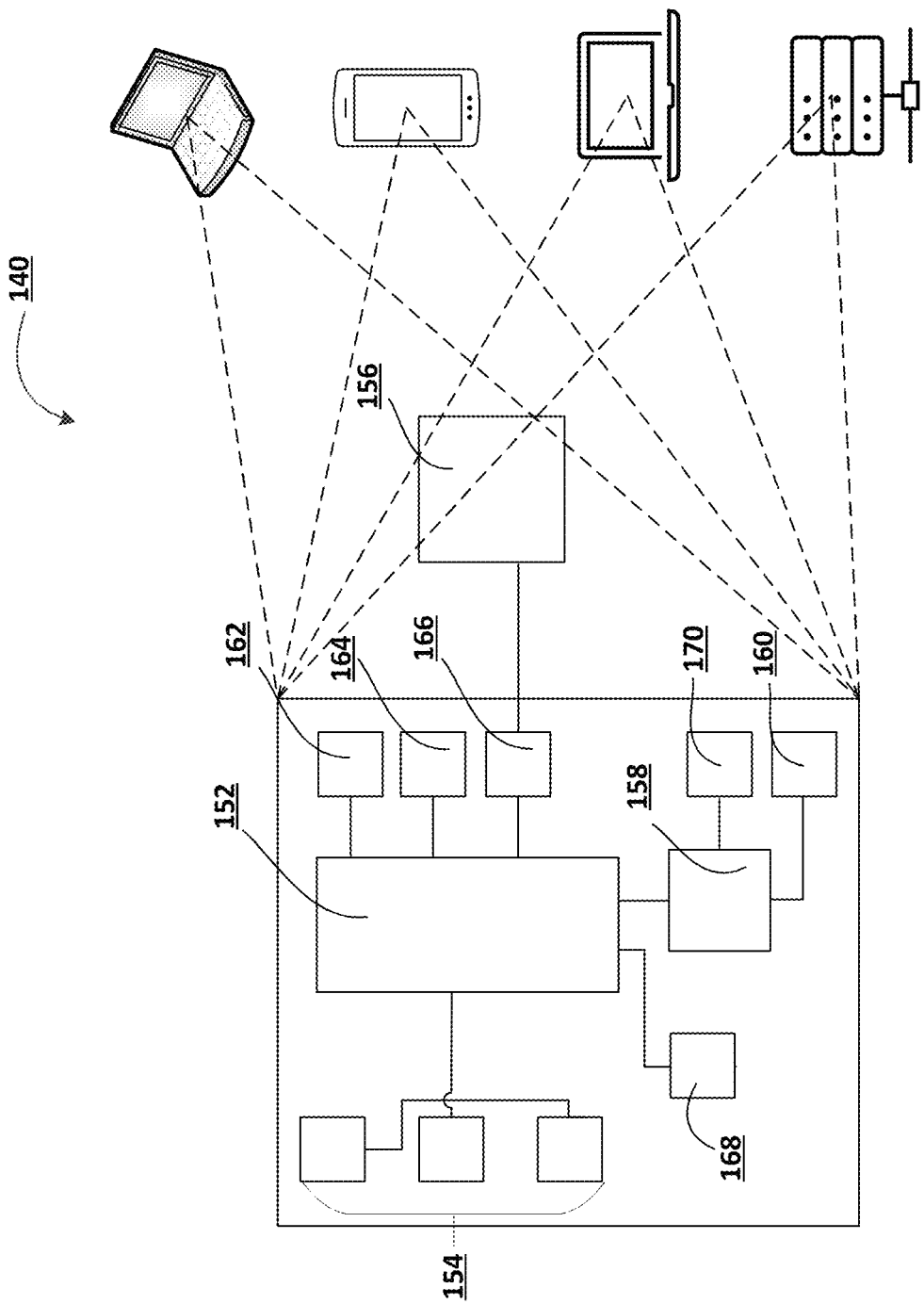
Figure 2:
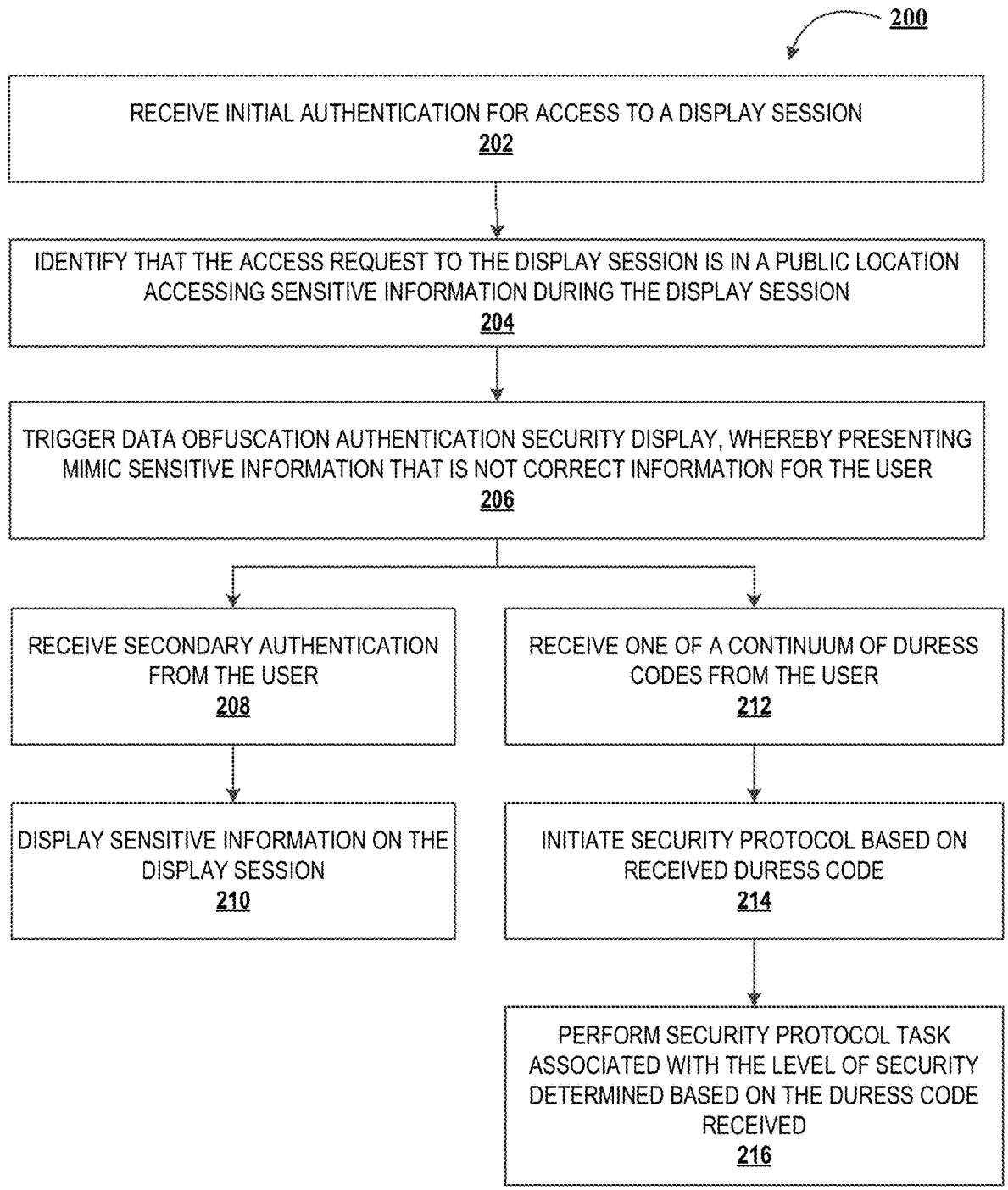
Figure 3:
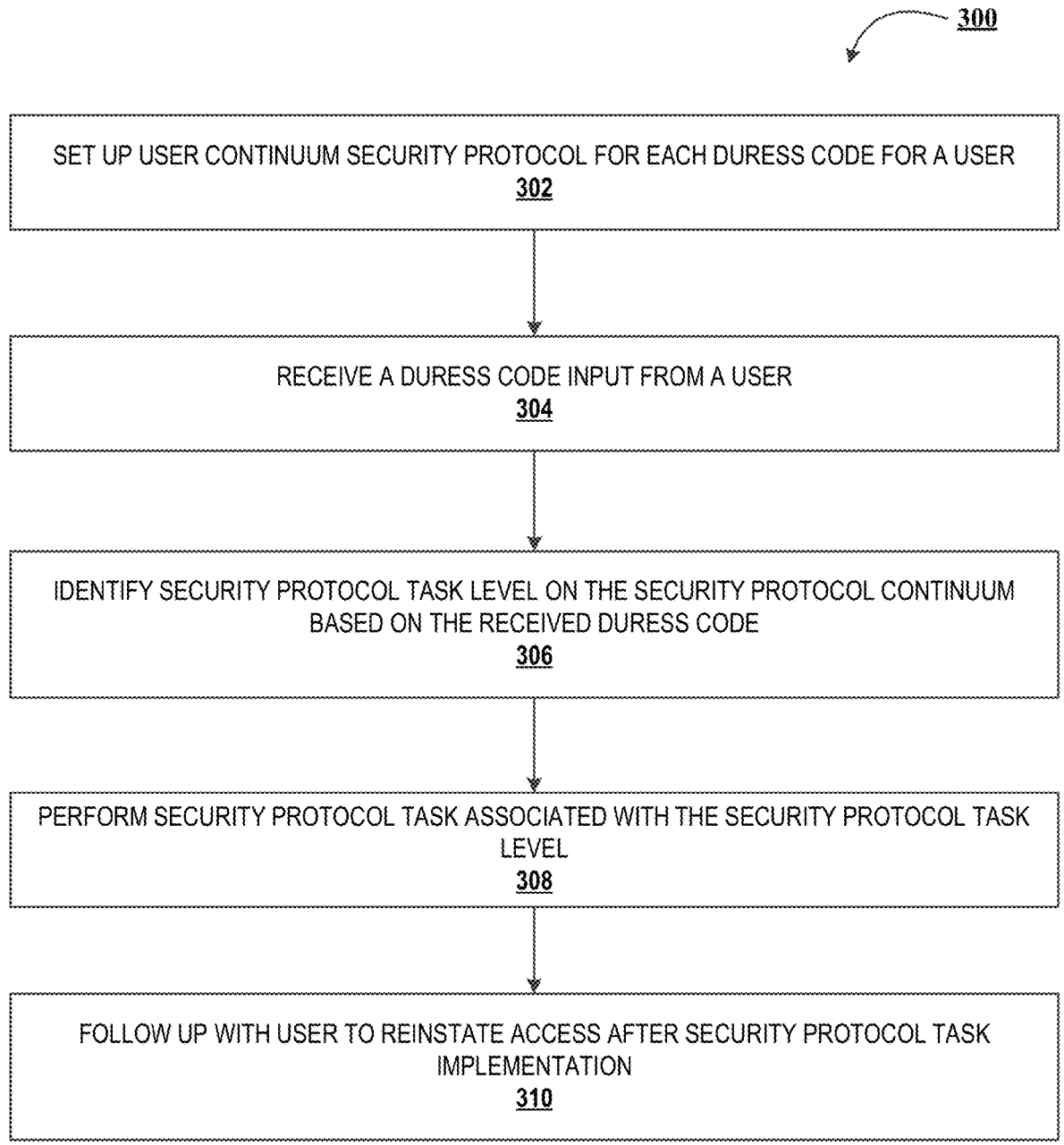
Figure 4:
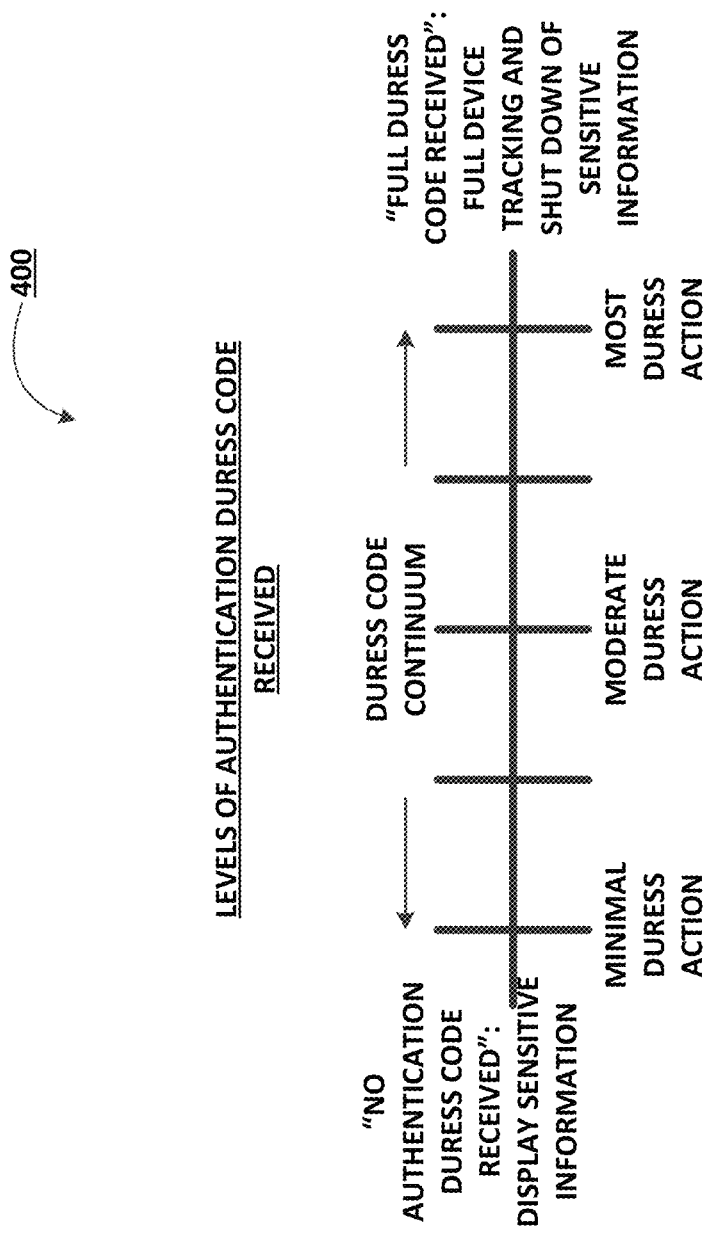

Having thus described embodiments of the invention in general terms, reference will now be made the accompanying drawings, wherein:

FIGS. 1A-1C illustrates technical components of an exemplary data obfuscation authentication security display distributed computing environment in accordance with an embodiment of the invention;

FIG. 2 illustrates a process flow for authentication within a data obfuscation authentication security display session, in accordance with an embodiment of the invention;

FIG. 3 illustrates a process flow for duress code security protocol continuum for duress identification within an obfuscation authentication security display session, in accordance with an embodiment of the invention; and FIG. 4 illustrates a process flow for duress code security protocol continuum for duress identification within an obfuscation authentication security display session, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, ATM transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Systems, computer program products, and methods are described herein for a data obfuscation authentication security display session. The invention provides a secondary authentication by recognizing the initial access to a display screen and overlaying and presenting false information on the screen. The false screen may mimic that of a real account screen, but the personal information about the user is false. The invention then requires the user to perform a secondary authentication to gain access information on the display session that is not false. The invention may allow for a duress code implementation in place of the secondary authentication, which initiates security protocols, include a continuum based protocol arrangement of security protocols.

Accordingly, the present invention provides a technical solution to a technical problem. As described herein, the technical problem includes displaying of sensitive data on a screen. In today's technical landscape display screens for displaying sessions are bright, easy to read, and easy to view. This leads to misappropriation from onlookers able to view sensitive information without the user being able to prevent it. The technical solution presented herein allows for data obfuscation authentication security display session being triggered and displayed prior to user secondary authentication into a sensitive display session such as one requiring authentication or including financial information.

FIGS. 1A-1C illustrate technical components of an exemplary data obfuscation authentication security display distributed computing environment 100, in accordance with an embodiment of the invention. As shown in FIG. 1A, the distributed computing environment 100 contemplated herein may include a system 130, a user device(s) 140, and a network 110 over which the system 130 and user device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the user device(s) 140 may have a user-server relationship in which the user device(s) 140 are remote devices that request and receive service from a centralized server, i.e., the system 130. In some other embodiments, the system 130 and the user device(s) 140 may have a peer-to-peer relationship in which the system 130 and the user device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The user device(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the user device(s) 140, in accordance with an embodiment of the invention. As shown in FIG. 1C, the user device(s) 140 includes a processor 152, memory 154, an input/output device such as a display 156, a communication interface 158, and a transceiver 160, among other components. The user device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the user device(s) 140, such as control of user interfaces, applications run by user device(s) 140, and wireless communication by user device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user device(s) 140 with other devices. External interface 168 may provide, for example, for wired communication in some implementations, or for wireless communication in other implementations, and multiple interfaces may also be used.

The memory 154 stores information within the user device(s) 140. The memory 154 can be implemented as one or more of a computer-readable medium or media, a volatile memory unit or units, or a non-volatile memory unit or units. Expansion memory may also be provided and connected to user device(s) 140 through an expansion interface (not shown), which may include, for example, a SIMM (Single In Line Memory Module) card interface. Such expansion memory may provide extra storage space for user device(s)

140 or may also store applications or other information therein. In some embodiments, expansion memory may include instructions to carry out or supplement the processes described above and may include secure information also. For example, expansion memory may be provided as a security module for user device(s) 140 and may be programmed with instructions that permit secure use of user device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user device(s) 140 to transmit and/or receive information or commands to and from the system 130 via the network 110. Any communication between the system 130 and the user device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the user device(s) 140 may provide the system 130 (or other user devices) permissioned access to the protected resources of the user device(s) 140, which may include a GPS device, an image capturing component (e.g., camera), a microphone, and/or a speaker.

The user device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation— and location-related wireless data to user device(s) 140, which may be used as appropriate by applications running thereon, and in some embodiments, one or more applications operating on the system 130.

The user device(s) 140 may also communicate audibly using audio codec 162, which may receive spoken information from a user and convert it to usable digital information. Audio codec 162 may likewise generate audible sound for a user, such as through a speaker, e.g., in a handset of user device(s) 140. Such sound may include sound from voice telephone calls, may include recorded sound (e.g., voice messages, music files, etc.) and may also include sound generated by one or more applications operating on the user device(s) 140, and in some embodiments, one or more applications operating on the system 130.

Various implementations of the distributed computing environment 100, including the system 130 and user device (s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for authentication within a data obfuscation authentication security display session 200, in accordance with an embodiment of the invention. As illustrated in block 202, the process for data obfuscataion authentication using security display sessions is initiated by receiving an initial authentication from a user to access a display session. The display session may be a website or webpage that is accessible by user authentication. The requirement of authentication may indicate that the display session comprises personal or sensitive information. This may include financial account information, credit card information, social security number information, or the like. For an example, a display session may be the user accessing their online financial account information, such as a credit card account, mortgage account, savings account, checking account, or the like. The user may enter a username and password on a device, such as a user device like a mobile phone or computer, or a public device like an ATM.

Once the system identifies that the user is providing an initial authentication for access to a display session, the system may then determine if the assess request for the display session is in a public location, as illustrated in block 204. In this way, the system identifies the location of the device used to access the display session. If that device is a mobile device, the system uses the geolocation of the device to determine if the mobile device is in a public location or a private location. Public locations may be streets, merchants, or the like. Private locations may be identified as at a private house or land. If that device is an affixed or semi-permanent device, such as a desktop computer or ATM, the system may a database of previously known public devices, such as ATMs or the like.

If the system identifies that the access to the display session is performed in a private location, the originally entered initial authentication for access to the display session is accepted and the real display session is presented to the user. However, as illustrated in block 206, when the system identifies that the access to the display session is being performed in a public location, the system triggers the data obfuscation authentication security display. The data obfuscation authentication security display presents a mimic display session where user sensitive information is presented incorrectly to the user.

The information presented to the user is a mimic display session, which means that it appears in the same color scheme as the display session but displays false information about the user. This could be a false name, false account information, or the like. This false information is displayed and is off from the real sensitive information to the point that the user understands the information to be false.

As illustrated in block 208, the user may review their surroundings, confirm that there are no onlookers of the screen, and provide a secondary authentication to the mimic display screen that unlocks the mimic display screen and presents the real sensitive information to the user via the display screen. As illustrated in block 210, the process continues by connecting the user to the real display screen session and display the sensitive information on the display session for the user to review and perform actions.

The user may review their surroundings and identify that there is an onlooker or that the user is in duress and being forced to open the display session. In this instant, the user may provide one or more different duress codes to the mimic display session, as illustrated in block 212. These duress codes may be in a continuum of codes.

FIG. 4 illustrates a process flow for duress code security protocol continuum 400, in accordance with an embodiment of the invention. On the left-hand side of the continuum, a "no authentication duress code received"/lowest level of authentication requires an authentication credential to remove the mimic display session and present the user with the real display session with real data. On the right-hand side of the continuum, a "full duress code received" highest level of duress code presented by the user requires full duress action including implementation of a full security protocol task response by the system. This means that it requires the strictest combination of duress response. In between the two extremes, "a minimal duress action" requires minimal duress action response or minimal security protocol task, moderate duress action response with a moderate security protocol task or most duress action response with a full security protocol task for various points along the continuum and will correlate to the number of matches between the user action, the duress code provided, and the duress action response provided by the system. The continuum generally represents the number of duress code inputs and/or the relative strength of the duress code response for that point on the continuum.

The duress code responses may include security protocol tasks and may be minimal or significant. Using the duress code, the system initiates security protocols. These security protocols include a continuum of protocols including a full response action including a complete shutdown of the user's phone, ATM, or computer. Another full response action may be to lock or shut down specific applications comprising sensitive user information. Moderate response actions may include sending alerts to authorities or sending alerts to financial institutions for misappropriation protection. A minimal duress response action may be locking the device, setting off alarm, or the like. The response action is determined based on the duress code inputted by the user. In some embodiments, in any response action level, the system may also activate and manipulate the camera of the phone, ATM, or computer to continually stay on and record the situation.

Returning to FIG. 2, as illustrated in block 212, the system receives one of the continuum of duress codes from the user via the mimic display session. The system identifies the level of duress response or action associated with the duress code and initiates the security protocol associated with that duress code, as illustrated in block 214. The security protocol level may be based on the duress code received and may comprise a continuum from light to full security protocol task depending on the code transmitted. As illustrated in block 216, the system then performs the security protocol task level, either full, moderate, or minimal depending on the code received.

FIG. 3 illustrates a process flow for duress code security protocol continuum for duress identification within an obfuscation authentication security display session 300, in accordance with an embodiment of the invention. As illustrated in block 302, the process 300 is initiated by setting up the user continuum security protocol for each duress code for the user. In this way, the user may set up duress codes for each of the full, moderate, or minimal duress code for the user. In this way, the system may identify several different duress codes from a user.

As illustrated in block 304, the process 300 continues by receiving a duress code inputted by the user. In this way, the user may be on the mimic display session and provide the system with a duress code and not an authorization code for access to the real display session and the data associated therewith. The system may then identify the security protocol task level on the continuum based on the received duress code, as illustrated in block 306. In this way, the system identifies the duress code as being the full, moderate, or minimal duress response. Upon identification of the inputted duress code, the system triggers an override response of the device associated with the duress code and activates the camera on the device. The activated camera and video associated with the camera are communicated externally to the system to store the stream.

Next, as illustrated in block 308, the system performs the security protocol task associated with the duress code level. These security protocols include a continuum of protocols including a full response action including a complete shutdown of the user's phone, ATM, or computer. Another full response action may be to lock or shut down specific applications comprising sensitive user information. Moderate response actions may include sending alerts to authorities or sending alerts to financial institutions for misappropriation protection. A minimal duress response action may be locking the device, setting off alarm, or the like. The response action is determined based on the duress code inputted by the user.

Finally, as illustrated in block 310, the process 300 is completed by following up with the user to reinstate access after security protocol task implementation.

In some embodiments, the invention provides for data obfuscation authentication security for a display session. In this way, when a user logs into an account, such as a sensitive account regarding resources or personal matters, once logged in the screen automatically displays the user information even if the user is in a public place where others may be able to see the screen. For example, once the user gains access to financial account information, whether at an automated teller machine (ATM), mobile application access, computer access, or the like, the financial information of the user is on display for anyone near the screen to see. This is the same for not just financial account information but for other personal information that may be presented on a display. Onlookers or other individuals may be able to visualize exact amounts that the user has in one or more financial accounts or other personal information of the user by being able to overlook and see the authenticated screen.

This system provides a secondary authentication by recognizing the initial access to an account by a user, but instead of presenting account or sensitive information, the system overlays and presents the user with a false account screen. The false account screen may mimic that of a real account screen, but the personal information about the user, such as their name, address, resource amounts, telephone numbers, and the like are not correct. The user may then perform a secondary authentication to gain access to the real account screen or select a duress code at the false account screen. Using the duress code, the system initiates security protocols. These security protocols include a complete shutdown of the user's phone, ATM, or computer, turning off all applications, requiring all applications to be password protected (voice or additional written password), sending alerts to authorities, sending alerts to financial institutions for misappropriation protection, locking the device, setting off alarm, or the like. The system may also identify the duress code and manipulate the camera of the phone, ATM, or computer to continually stay on and record.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data obfuscation authentication security display session deployment, the system comprising:
   at least one non-transitory storage device; and
   at least one processor coupled to the at least one non-transitory storage device, wherein the at least one processor is configured for:
      identifying an initial successful authentication request to access a display session by a user from a device;

accessing the device associated with the request to access the display session and determine a location of the device;

triggering data obfuscation authentication security display whereby presenting a mimic display session as an initial display page to the user upon the successful authentication request to access the display session, wherein the mimic display session displays false information about the user including false account information, wherein the mimic display session further comprises a secondary authentication on the initial display page to unlock a real display screen with accurate account information;

receiving, via the secondary authentication on the initial display screen one of a continuum of duress codes from the device instead of a confirmation of secondary authentication; and performing a security protocol task based on the duress code received, wherein the security protocol task includes an escalation continuum of protocol tasks.

2. The system of claim 1, wherein receiving one of the continuum of duress codes further triggers an override response of the device associated with the duress code and activates a camera on the device, wherein a stream from the camera is transmitted external to the device.

3. The system of claim 1, further comprising receiving a secondary authentication from the device associated with the user via the mimic display session and granting access to the display session with sensitive data.

4. The system of claim 1, wherein determining the location of the device further comprises determining the device is in a public location based on geolocation of the device.

5. The system of claim 1, wherein the display session further comprises a session that displays user sensitive data, wherein user sensitive data is financial account data.

6. The system of claim 1, wherein the escalation continuum of protocol tasks includes a security protocol task level of full, moderate, or minimal security depending on the one of the continuum of duress codes received.

7. A computer program product for data obfuscation authentication security display session deployment, the computer program product comprising at least one non-transitory computer readable medium having computer-readable program code portions embodied therein, the computer-readable program code portions comprising:

an executable portion configured for identifying an initial successful authentication request to access a display session by a user from a device;

an executable portion configured for accessing the device associated with the request to access the display session and determine a location of the device;

an executable portion configured for triggering data obfuscation authentication security display whereby presenting a mimic display session as an initial display page to the user upon the successful authentication request to access the display session, wherein the mimic display session displays false information about the user including false account information, wherein the mimic display session further comprises a secondary authentication on the initial display page to unlock a real display screen with accurate account information;

an executable portion configured for receiving, via the secondary authentication on the initial display screen one of a continuum of duress codes from the device instead of a confirmation of secondary authentication; and an executable portion configured for performing a security protocol task based on the duress code received, wherein the security protocol task includes an escalation continuum of protocol tasks.

8. The computer program product of claim 7, wherein receiving one of the continuum of duress codes further triggers an override response of the device associated with the duress code and activates a camera on the device, wherein a stream from the camera is transmitted external to the device.

9. The computer program product of claim 7, further comprising an executable portion configured for receiving a secondary authentication from the device associated with the user via the mimic display session and granting access to the display session with sensitive data.

10. The computer program product of claim 7, wherein determining the location of the device further comprises determining the device is in a public location based on geolocation of the device.

11. The computer program product of claim 7, wherein the display session further comprises a session that displays user sensitive data, wherein user sensitive data is financial account data.

12. The computer program product of claim 7, wherein the escalation continuum of protocol tasks includes a security protocol task level of full, moderate, or minimal security depending on the one of the continuum of duress codes received.

13. A computer-implemented method for data obfuscation authentication security display session deployment, the computer-implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying an initial successful authentication request to access a display session by a user from a device;

accessing the device associated with the request to access the display session and determine a location of the device;

triggering data obfuscation authentication security display whereby presenting a mimic display session as an initial display page to the user upon the successful authentication request to access the display session, wherein the mimic display session displays false information about the user including false account information, wherein the mimic display session further comprises a secondary authentication on the initial display page to unlock a real display screen with accurate account information;

receiving, via the secondary authentication on the initial display screen one of a continuum of duress codes from the device instead of a confirmation of secondary authentication; and performing a security protocol task based on the duress code received, wherein the security protocol task includes an escalation continuum of protocol tasks.

14. The computer-implemented method of claim 13, wherein receiving one of the continuum of duress codes further triggers an override response of the device associated with the duress code and activates a camera on the device, wherein a stream from the camera is transmitted external to the device.

15. The computer-implemented method of claim 13, further comprising receiving a secondary authentication from the device associated with the user via the mimic display session and granting access to the display session with sensitive data.

16. The computer-implemented method of claim 13, wherein determining the location of the device further comprises determining the device is in a public location based on geolocation of the device.

17. The computer-implemented method of claim 13, wherein the display session further comprises a session that displays user sensitive data, wherein user sensitive data is financial account data.

\* \* \* \* \*